United States Patent
Patel et al.

(10) Patent No.: US 12,542,795 B2
(45) Date of Patent: Feb. 3, 2026

(54) AI-DRIVEN MULTI-FACETED CYBER THREAT CLASSIFICATION AND CATEGORIZATION

(71) Applicant: S&P Global Inc., New York, NY (US)

(72) Inventors: Urjitkumar Patel, Scotch Plains, NJ (US); Chinmay Gondhalekar, Jersey City, NJ (US); Fang-Chun Yeh, New York, NY (US); Cristina Polizu, Great Neck, NY (US)

(73) Assignee: S&P Global Inc., New York, NY (US)

( * ) Notice: Subject to any disclaimer, the term of this patent is extended or adjusted under 35 U.S.C. 154(b) by 208 days.

(21) Appl. No.: 18/432,940

(22) Filed: Feb. 5, 2024

(65) Prior Publication Data

US 2025/0254187 A1 Aug. 7, 2025

(51) Int. Cl.
*H04L 9/40* (2022.01)
*G06F 18/2415* (2023.01)

(52) U.S. Cl.
CPC ...... *H04L 63/1425* (2013.01); *G06F 18/2415* (2023.01); *H04L 63/1416* (2013.01)

(58) Field of Classification Search
CPC ............. H04L 63/1425; H04L 63/1416; G06F 18/2415
See application file for complete search history.

(56) References Cited

U.S. PATENT DOCUMENTS

| | | | | |
|---|---|---|---|---|
| 11,288,364 B1* | 3/2022 | Savir | .................. | G06F 21/53 |
| 12,192,364 B1* | 1/2025 | Mullaney | .............. | H04L 9/3213 |
| 2019/0363925 A1* | 11/2019 | Davis | .................... | H04L 41/069 |
| 2021/0073377 A1* | 3/2021 | Coull | ..................... | G06N 3/045 |
| 2021/0200877 A1* | 7/2021 | Salo | ......................... | G06F 16/36 |
| 2022/0292189 A1* | 9/2022 | Silberman | ............. | G06F 21/554 |
| 2022/0350884 A1* | 11/2022 | Hencinski | ............. | G06F 21/554 |
| 2023/0195828 A1* | 6/2023 | Huang | ................ | G06F 16/906 |
| | | | | 707/738 |
| 2023/0385548 A1* | 11/2023 | Tully | ..................... | G06F 40/30 |
| 2023/0412627 A1* | 12/2023 | Szilágyi | .............. | G06F 11/0793 |
| 2024/0275817 A1* | 8/2024 | Grout | .................. | H04L 63/1425 |
| 2024/0354503 A1* | 10/2024 | Baruch | ................. | G06F 16/345 |
| 2024/0388602 A1* | 11/2024 | Angiolelli | ........... | H04L 63/1433 |

(Continued)

*Primary Examiner* — Oleg Survillo
(74) *Attorney, Agent, or Firm* — Yee & Associates, P.C.

(57) ABSTRACT

Classifying cybersecurity signals from media sources into distinct categories is provided. The method comprises receiving a first data subset comprising data points labeled by subject matter experts according to a predetermined number of specified categories. The data points include information regarding cybersecurity from a set of news articles. The first subset is enriched by applying a random forest algorithm to generate synthetic data points, thereby deriving a second data subset that is augmented from the first subset. The combined first and second data subsets comprise an enhanced training dataset. A BERT model is trained with the enhanced training dataset to classify cybersecurity-related news according to the specified categories. The BERT model utilizes a specialized vector database integrating domain-specific cyber-related terminology and contextual embeddings. The trained BERT model classifies a second set of news articles according to the specified categories. The classification accounts for evolving cybersecurity terminologies and threat landscapes.

24 Claims, 15 Drawing Sheets

(56) References Cited

U.S. PATENT DOCUMENTS

| | | | |
|---|---|---|---|
| 2024/0403428 A1* | 12/2024 | Lal | G06F 21/566 |
| 2025/0053587 A1* | 2/2025 | Coulter | G06F 16/367 |
| 2025/0148472 A1* | 5/2025 | Ur | G06Q 30/0225 |
| 2025/0165616 A1* | 5/2025 | Cameron | G06F 21/552 |
| 2025/0209156 A1* | 6/2025 | Sankaran | H04L 63/1441 |
| 2025/0238510 A1* | 7/2025 | Sharpe | G06F 21/566 |

* cited by examiner

| ID | LINK | PUBLISHED_DATETIME | UPDATED_DATETIME | HEADLINE | CONTENT | FEED_NAME |
|---|---|---|---|---|---|---|
| UQPuJTWfJ98oipewHLcFEf | https://www.bnnbloomberg.ca/tesla-data-breach-blamed-on-insider-wrongdoing-impcted-75-000-1.1961383 | 2023-08-20 17:40:21.000 | 2023-08-20 17:40:21.000 | Tesla Data Breach Blamed on 'Insider Wrongdoing' Impacted 75,000 - BNN Bloomberg | (Bloomberg) - Tesla Inc.'s May data breach impacted more than 75,000 people, included employee-related records and was a result of "insider ... | data theft |

FIG. 3

| CATEGORY | NEWS HEADLINES |
|---|---|
| RECENT CYBER ATTACK | Royal Mail hit by cyber attack causing 'severe disruption' to services<br>HHS compromised in massive MOVEit hack<br>FTX says $415 million of crypto was hacked<br>... |
| FUTURE CYBER THREAT | Metro Bank Warns Against Rising Malware Attacks<br>Apple issues 30-day warning to iPhone users<br>Alarm raised over Mozilla VPN security flaw<br>... |
| CYBER PREVENTION | Cisco Releases A Fix For The Major ClamAV Antivirus Software Flaw<br>Microsoft issues 75 patches, including three for zero-day<br>Android 14 Will Block Malware With Enhanced Security Updates<br>... |
| CYBER LITIGATION | CommonSpirit Health sued over ransomware attack<br>Meta hit with 390 mn euro fine over EU data breaches<br>JPMorgan Must Face Lawsuit by Ray-Ban Maker over $272 M<br>... |
| OTHER | This New McDonald's Hack Turns Sprite Into Cotton Candy Soda<br>Samsung Galaxy Z Fold 5 can fix design flaw present in the brand's folding<br>Our View: Google should have to answer for reckless site-blocking issues<br>... |

FIG. 4

| HYPERPARAMETER | VALUE |
|---|---|
| bootstrap | True |
| criterion | entropy |
| max_depth | 10 |
| max_features | auto |
| n_estimators | 100 |
| random_state | 42 |
| verbose | 0 |
| warm_start | False |

FIG. 8

| PARAMETER | VALUE |
|---|---|
| learning_rate | 2e-5 |
| per_device_train_batch_size | 8 |
| per_device_eval_batch_size | 8 |
| data_seed | 727 |
| seed | 767 |
| save_strategy | epoch |
| evaluation_strategy | epoch |
| load_best_model_at_end | True |
| num_train_epochs | 10.0 |

FIG. 9

| MODEL | CATEGORY | ACCURACY | PRECISION | RECALL | F1-SCORE |
|---|---|---|---|---|---|
| CANAL | CYBER ATTACK | 81.44 | 83.69 | 96.80 | 89.77 |
| | LITIGATION | 88.24 | 93.75 | 93.75 | 93.75 |
| | PREVENTION | 60.82 | 83.10 | 69.41 | 75.64 |
| | FUTURE THREAT | 47.37 | 90.00 | 50.00 | 64.29 |
| | OTHER | 86.37 | 93.35 | 92.04 | 92.69 |

FIG. 13

| CYBER NEWS | CANAL + Cyber Signal Detection + Entity Relevance |
|---|---|
| McLaren Health Care Facing 3 Lawsuits in Ransomware... | McLaren Health Care Facing 3 Lawsuits in Ransomware Hack - *Class - Litigation* |
| Seiko confirms thousands of user accounts were ... | Seiko confirms thousands of user accounts were breached in cyber-attack - *Class - Cyber Attack* |
| Microsoft fixes over 100 vulnerabilities, 2 act... | Microsoft fixes over 100 vulnerabilities, 2 actively exploited bugs - *Class - Prevention* |
| Buffer overflow bug gives root on potentially millions... | Buffer overflow bug gives root on potentially millions of Linux boxes - The Stack - *Class - Future Threat* |
| Mastercard introduces new grocery delivery and ... | Mastercard introduces new grocery delivery and streaming perks CNBC - *Class - Other* |

FIG. 14

AI-DRIVEN MULTI-FACETED CYBER THREAT CLASSIFICATION AND CATEGORIZATION

BACKGROUND INFORMATION

1. Field

The present disclosure relates generally to natural language processing, and more specifically to categorizing cyber-related terms from new media.

2. Background

The recent escalation in cyber attacks is a significant concern that spans across multiple sectors. As reported by ISACA's (Information Systems Audit and Control Association) 2023 State of Cybersecurity, there's an evident increase in cyberattacks across organizations. This trend is not limited to one domain; it affects diverse areas such as technology, oil and gas, healthcare, education, and finance. The technology sector frequently confronts data breaches and intellectual property theft, while the oil and gas industry faces threats to its critical infrastructure. In finance, cyber attacks can lead to significant financial losses and undermine consumer confidence. Each of these sectors, including healthcare, where data encryption in ransomware attacks is alarmingly high, and education, with its highest rate of ransomware incidents, demonstrates the broad spectrum of cyber vulnerability.

SUMMARY

An illustrative embodiment provides a computer-implemented method for classifying cybersecurity signals from media sources into distinct categories. The method comprises receiving a first data subset comprising data points labeled by subject matter experts according to a predetermined number of specified categories, wherein the data points include information regarding cybersecurity from a first set of news articles. The first data subset is enriched by applying a random forest algorithm to generate synthetic data points, thereby deriving a second data subset that is augmented from the first data subset, wherein the combined first and second data subsets comprise an enhanced training dataset. A bidirectional encoder representations from transformers (BERT) model is trained with the enhanced training dataset to classify cybersecurity-related news according to the number of specified categories, wherein the BERT model utilizes a specialized vector database integrating domain-specific cyber-related base terminology and contextual embeddings. The trained BERT model then classifies a second set of news articles according to the specified categories, wherein the classification accounts for evolving cybersecurity terminologies and threat landscapes.

Another illustrative embodiment provides a system for classifying cybersecurity signals from media sources into distinct categories. The system comprises a storage device that stores program instructions and one or more processors operably connected to the storage device and configured to execute the program instructions to cause the system to: receive a first data subset comprising data points labeled by subject matter experts according to a predetermined number of specified categories, wherein the data points include information regarding cybersecurity from a first set of news articles; enrich the first data subset by applying a random forest algorithm to generate synthetic data points, thereby deriving a second data subset that is augmented from the first data subset, wherein the combined first and second data subsets comprise an enhanced training dataset; train a bidirectional encoder representations from transformers (BERT) model with the enhanced training dataset to classify cybersecurity-related news according to the number of specified categories, wherein the BERT model utilizes a specialized vector database integrating domain-specific cyber-related base terminology and contextual embeddings; and classify, by the BERT model, a second set of news articles according to the specified categories, wherein the classification accounts for evolving cybersecurity terminologies and threat landscapes.

Another illustrative embodiment provides a computer program product for classifying cybersecurity signals from media sources into distinct categories. The computer program product comprises a computer-readable storage medium having program instructions embodied thereon to perform the steps of: receiving a first data subset comprising data points labeled by subject matter experts according to a predetermined number of specified categories, wherein the data points include information regarding cybersecurity from a first set of news articles; enriching the first data subset by applying a random forest algorithm to generate synthetic data points, thereby deriving a second data subset that is augmented from the first data subset, wherein the combined first and second data subsets comprise an enhanced training dataset; training a bidirectional encoder representations from transformers (BERT) model with the enhanced training dataset to classify cybersecurity-related news according to the number of specified categories, wherein the BERT model utilizes a specialized vector database integrating domain-specific cyber-related base terminology and contextual embeddings; and classifying, by the BERT model, a second set of news articles according to the specified categories, wherein the classification accounts for evolving cybersecurity terminologies and threat landscapes.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 3 depicts an example data structure for a single article entry from a new article data feed in accordance with an illustrative embodiment;

FIG. 4 depicts a table listing examples of each of the five categories of cyber related news in accordance with an illustrative embodiment;

FIG. 8 depicts a table of random forest hyperparameters used to train a random forest model in accordance with an illustrative embodiment;

FIG. 9 depicts a table providing final hyper-parameters used for BERT model fine-tuning in accordance with an illustrative embodiment;

FIG. 13 depicts an example table of CANAL model performance in accordance with an illustrative embodiment;

FIG. 14 depicts a table of example classification snippets generated by a CANAL model in accordance with an illustrative embodiment;

DETAILED DESCRIPTION

The illustrative embodiments recognize and take into account that the realm of cybersecurity is undergoing a significant transformation, driven by the increasing frequency and complexity of cyber threats in various sectors. The ISACA 2023 State of Cybersecurity report indicates a rise in cyberattacks impacting sectors such as technology, healthcare, education, and finance. In response to these challenges, Artificial Intelligence (AI) is playing a crucial role in evolving the cybersecurity landscape. AI-driven approaches are enhancing threat detection capabilities and enabling automated responses.

The illustrative embodiments also recognize and take into account that, in this context, the timely detection and dissemination of information about cyber attacks and threats becomes crucial. News articles, in particular, play an essential role in providing real-time information and early warnings.

The illustrative embodiments also recognize and take into account that recent advancements in Natural Language Processing (NLP), especially transformer-based models like BERT (bidirectional encoder representations from transformers), T5, Flan, GPT, Llama, Mistral, Claude, and PaLM have revolutionized various NLP tasks, including applications in the cyber domain. These powerful models have shown remarkable capabilities in processing and understanding complex language structures. However, the widespread adoption of these advanced models is often hampered by their need for substantial computational resources and the associated high costs of infrastructure or API (application programming interface) usage.

The illustrative embodiments also recognize and take into account that for tasks such as Cyber Categorization, a simpler and smaller BERT model when finetuned with good data, outperforms the larger, more expensive models.

The illustrative embodiments also recognize and take into account that there appears to be a gap in the literature concerning the application of BERT-based models for generating cyber alerts from more real time news sources like Google News.

The illustrative embodiments provide a cost-efficient empirical framework, leveraging a finetuned BERT architecture with minimal training data requirements. This framework excels in accurately categorizing cyber-related content from news articles, ensuring timely awareness for stakeholders. The illustrative embodiments employ a Cyber Activity News Alerting Language (CANAL) model specifically developed for the efficient categorization of cyber-related information within news articles. The illustrative embodiments utilize a novel classification scheme, grouping cyber-related news into five distinct categories, each serving a different function across business domains.

Figure 1:
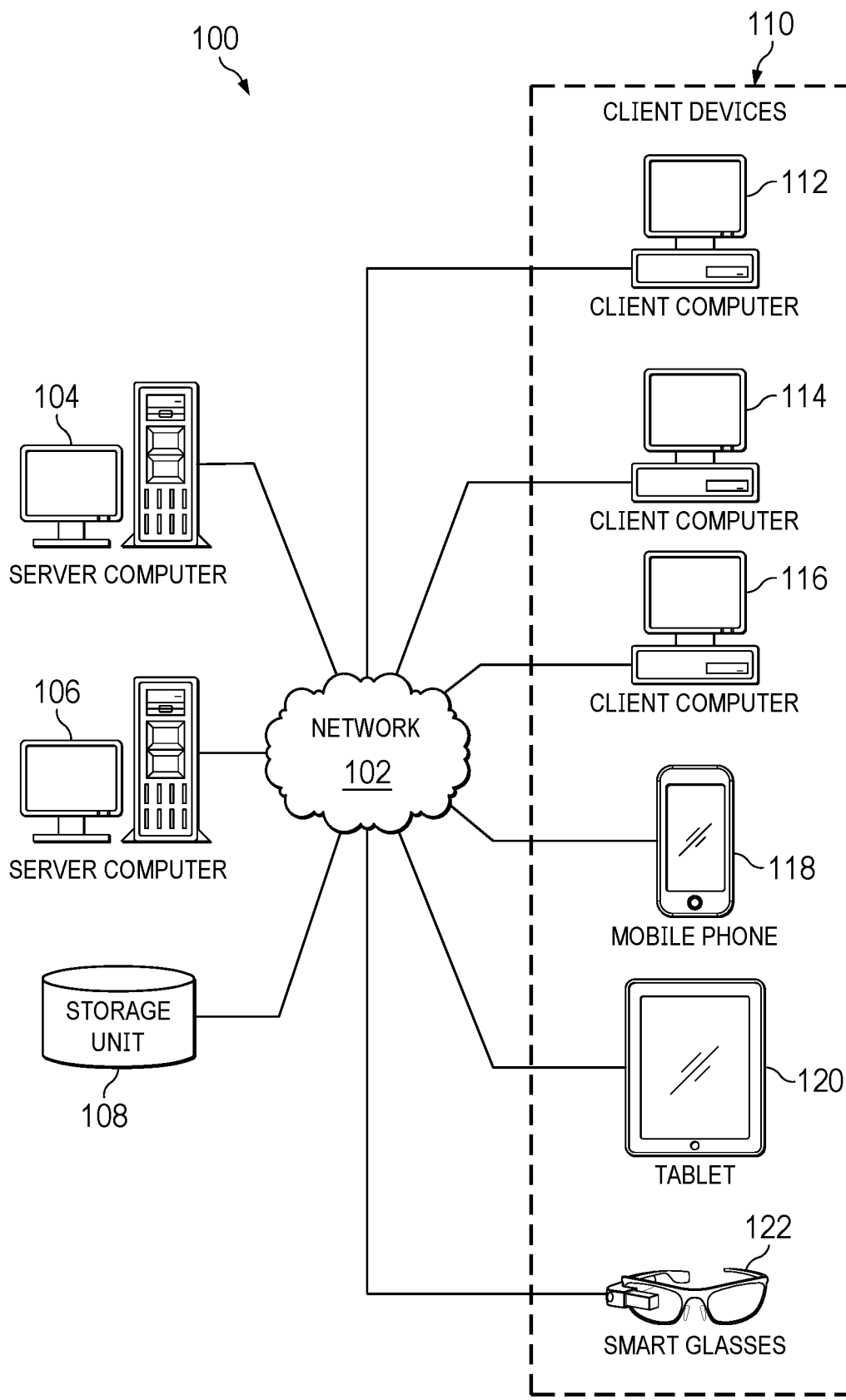
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 includes client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
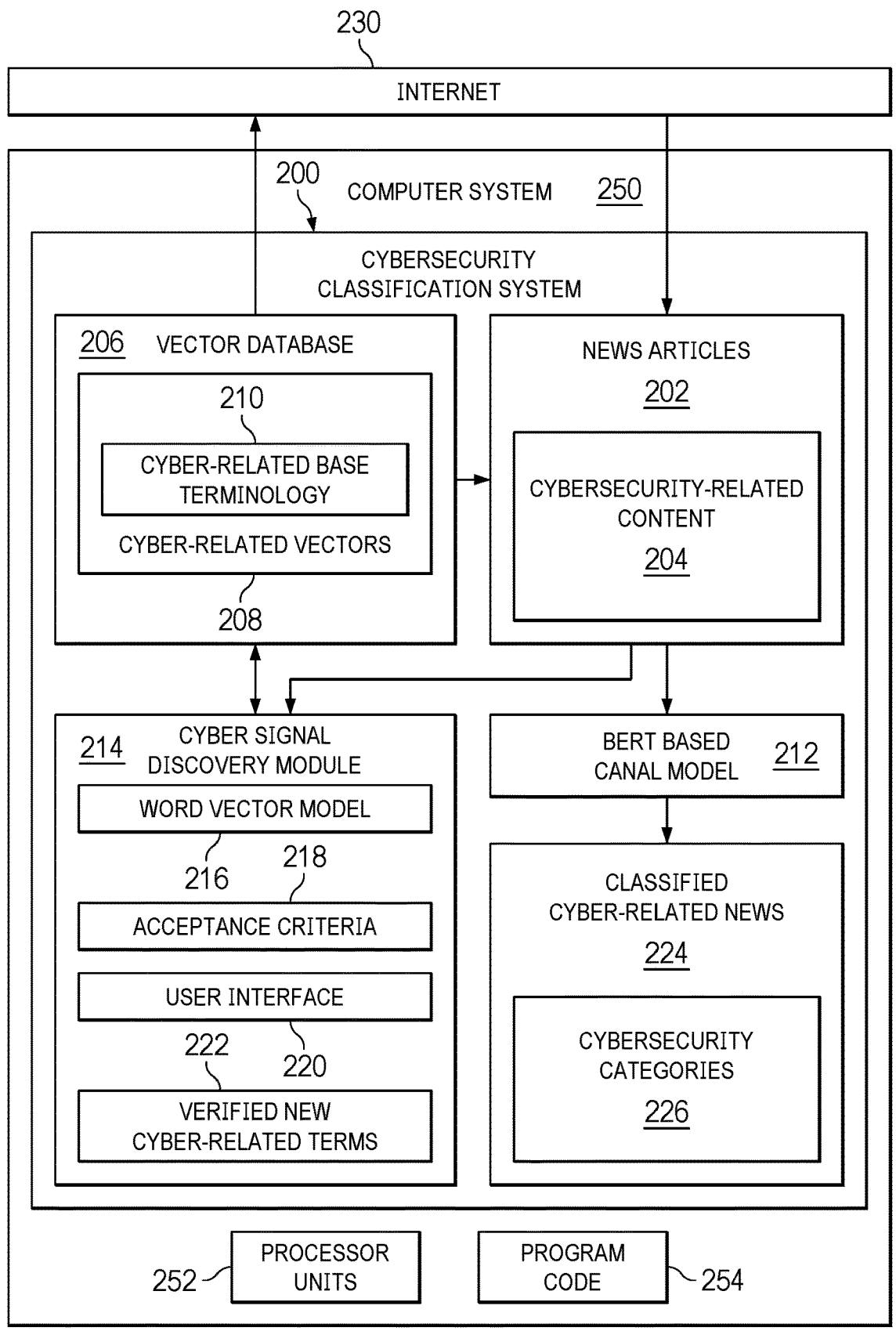
FIG. 2 is a block diagram of a cybersecurity classification system depicted in accordance with an illustrative embodiment.

FIG. 2 is a block diagram of a cybersecurity classification system depicted in accordance with an illustrative embodiment. Cybersecurity classification system 200 might be implemented in network data processing system 100 in FIG. 1.

Cybersecurity classification system 200 processes news articles 202 in search of cybersecurity-related content 204. These news articles 202 fetched from the Internet 230 using cyber feeds created using cyber-related base terminology 210 in a vector database 206. This cyber-related base terminology 210 is represented by cyber-related vectors 208. New articles 202 might be fetched daily.

Cybersecurity classification system 200 uses vector database 206 of cyber-related base terminology 210 to search for cybersecurity-related content 204. Once new articles 202 are fetched, cyber terms are highlighted using the existing cyber-based base terminology 210, and the same article is fed to a BERT (bidirectional encoder representations from transformers) based CANAL (Cyber Activity News Alerting Language) model 212, which is trained to classify the articles in one of the five categories.

BERT based CANAL model 212 analyzes the news articles 202 according to the vector database 206 (see FIG. 7). From this analysis, the BERT based CANAL modal 212 generates classified cyber-related news 224. This news is classified according to a number of specified cybersecurity categories (see FIG. 14).

Figure 5:
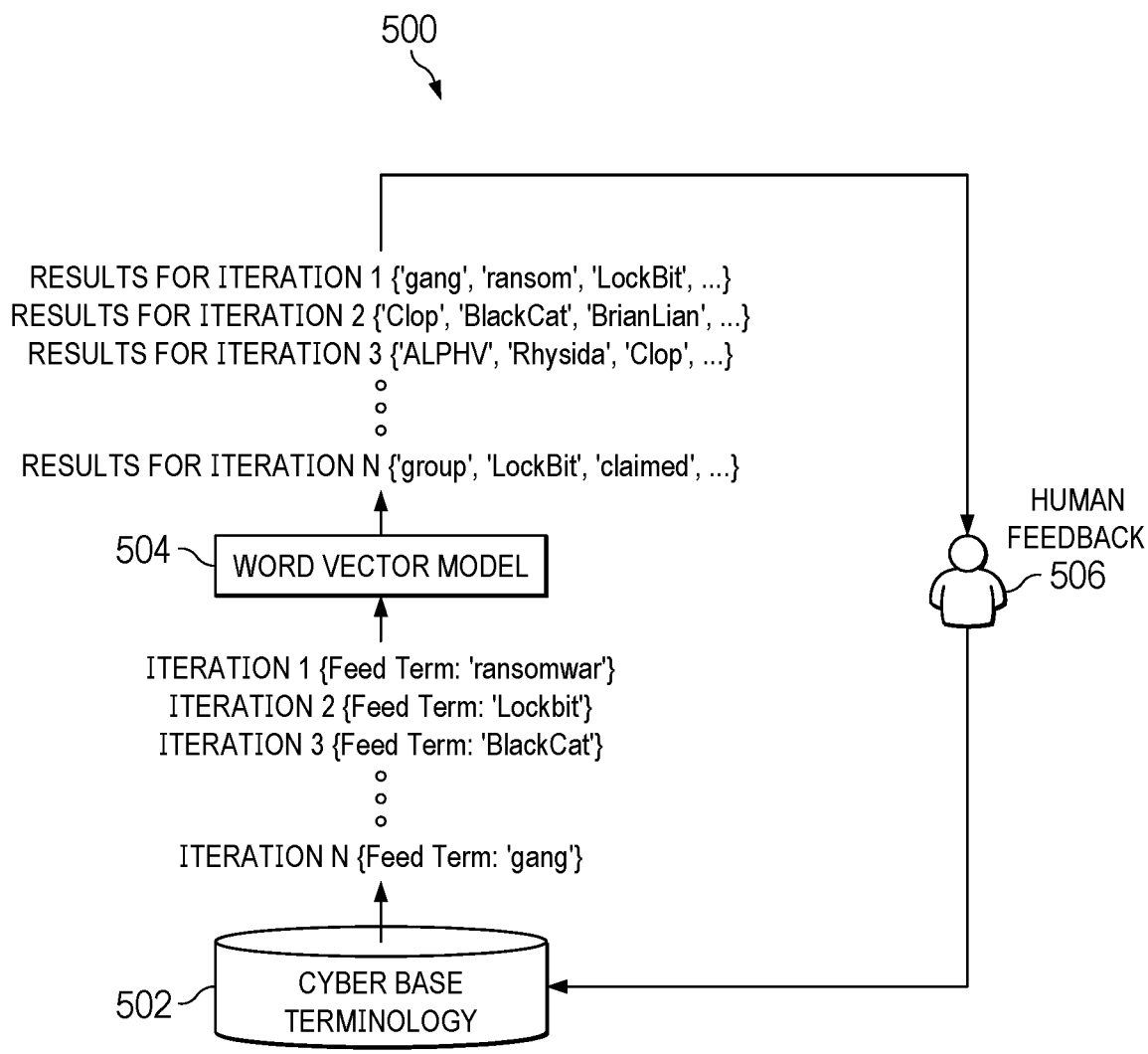
FIG. 5 depicts a diagram illustrating an emerging cyber signal discovery module in accordance with an illustrative embodiment.

Because cyber-related terms are constantly changing and new ones come into general use, cybersecurity classification system 200 periodically updates the vector database 206 with new terms generated by a cyber signal discovery module 214 (see FIG. 5). Cyber signal discovery module 214 utilizes a word vector model 216 to discover potential new cyber-related terms. These potential new cyber-related terms are those that satisfy specified acceptance criteria such as, e.g., cosine similarity, without duplicating terms already in the vector database 206. The candidate cyber-related terms are then confirmed (or not) by a user via user interface 220. Those that are confirmed become verified new cyber-related terms 222 which are added as new cyber-related vectors 208 in vector database 206.

Cybersecurity classification system 200 can be implemented in software, hardware, firmware, or a combination thereof. When software is used, the operations performed by cybersecurity classification system 200 can be implemented in program code configured to run on hardware, such as a processor unit. When firmware is used, the operations performed by cybersecurity classification system 200 can be implemented in program code and data and stored in persistent memory to run on a processor unit. When hardware is employed, the hardware can include circuits that operate to perform the operations in cybersecurity classification system 200.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 250 is a physical hardware system and includes one or more data processing systems. When more than one data processing system is present in computer system 250, those data processing systems are in communication with each other using a communications medium. The communications medium can be a network. The data processing systems can be selected from at least one of a computer, a server computer, a tablet computer, or some other suitable data processing system.

As depicted, computer system 250 includes a number of processor units 252 that are capable of executing program code 254 implementing processes in the illustrative examples. As used herein, a processor unit in the number of processor units 252 is a hardware device and is comprised of hardware circuits such as those on an integrated circuit that respond and process instructions and program code that operate a computer. When a number of processor units 252 execute program code 254 for a process, the number of processor units 252 is one or more processor units that can be on the same computer or on different computers. In other words, the process can be distributed between processor units on the same or different computers in a computer system. Further, the number of processor units 252 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In the rapidly evolving domain of cybersecurity, the daily influx of thousands of news articles presents a significant challenge in information management and analysis. The illustrative embodiments categorize these articles into five distinct categories: Recent Cyber Attack, Litigation, Future Threats, Preventive Action, and "Other". From these sources, the illustrative embodiments discover and highlight emerging cyber threats and signals. This dual approach systematically organizes and analyzes the vast array of incoming cyber-related news, enabling a more focused and efficient method for cyber threat intelligence. The illustrative embodiments achieve these objectives using a practical, efficient, and cost-effective approach, distinguishing it from the more expensive Large Language Models (LLMs).

The category of Recent Cyber Attack encompasses articles that report on recent real cyber attacks targeting entities. These articles provide critical insights into actual cyber threats that have resulted in tangible damage to companies. These articles offer invaluable information for understanding the evolving cyber threat landscape.

The category of Cyber Litigation pertain to news articles that discuss legal actions, investigations, or charges related to cyber incidents. These articles are crucial for professionals tracking legal developments and consequences in the cybersecurity domain.

The category of Future Cyber Threats includes articles that address potential cyber risks and threats that organizations may face in the future. These articles are forward-looking and target an audience interested in proactive risk assessment.

The category of Cyber Risk Preventive includes articles that highlight positive actions, remedies, vulnerability fixes, and patches aimed at reducing the likelihood of future cyber risks. This category is particularly important as it contributes to building a positive cyber profile for an entity.

The "Other" category encompasses a diverse range of articles, including reports, studies, educational content, guidance materials, and miscellaneous topics related to cybersecurity. This category serves as a catchall for articles that do not neatly fit into the first four classifications, providing additional context and insights into various aspects of cybersecurity.

By efficiently sorting these articles into relevant categories, the illustrative embodiments seek to enhance the utility and accessibility of cyber news, making it more actionable for cybersecurity professionals and organizations.

As an example, we utilize Google News data via news alerts RSS feeds for our experiment. Initially, leveraging SME (Subject Matter Expertise), we configured the Google News Alerts with specific cyber terms such as 'data breach,' 'ransomware,' and 'cyberattack.' This setup generates a substantial number of news alerts daily, which we scrape and save to our database. We continually refine these feeds, adding new terms as they emerge in the cyber domain.

Over a period of one year and ten months, starting from early 2022 through to the end of October 2023, we amassed a collection of approximately 265,000 cyber related articles. Each article is accompanied by metadata such as ID, link, publication date, and a headline, as detailed in the example data structure shown in FIG. 3. For our experiments, we focus exclusively on the headlines, which we have found to be sufficiently informative for our categorization challenge. The table illustrated in FIG. 4 showcases various examples of news titles within each category.

Given a news title comprising a sequence of N tokens $w_1, w_2, \ldots, w_N$, we aim to determine a probability distribution P over five cyber categories. This distribution is a function of the input tokens, represented as:

$$P = f(w_1, w_2, \ldots, w_N),$$

where f denotes the model that estimates the probability distribution that satisfies the following condition:

$$\Sigma_{i=1}^{5} P_i = 1$$

where, $$P_i \in \{P_{cyber_{attack}}, P_{future_{threat}}, P_{prevention}, P_{litigation}, P_{other}\}$$

The predicted final category is obtained through a decision function g, which could be a simple maximization of the probabilities or a threshold-based approach:

Predicted Category=$g(P)$ where g: P→Category

This function evaluates the highest probability or applies a pre-defined threshold to determine the most likely category.

FIG. 5 depicts a diagram illustrating an emerging cyber signal discovery module in accordance with an illustrative embodiment.

The emerging cyber signal discovery module 500 identifies and catalogs new cyber attack terms for related news article retrieval. The module comprises three integral components: predefined cyber base terminologies 502, a tailored word vector model 504, and human feedback 506. Initially, a curated set of 30 cyber base terminologies 502 is selected with the aid of subject matter expertise. Subsequently, each terminology is fed into the word vector model 504, which, in turn, outputs related new terms meeting predefined criteria. Lastly, through a process of human feedback 506, the returned terms are meticulously reviewed and incorporated into the existing repository of cyber base terminologies 502. This systematic approach ensures the continual augmentation and refinement of the terminology lexicon to effectively adapt to the evolving landscape of cyber threats.

The word vector model 504 is by all news articles using the skip-gram method. The training objective of the skip-gram model is to find word representations that are useful for predicting the surrounding words in a sentence or a document. More formally, given a sequence of training words $w_1, w_2 \ldots w_T$, the objective of the Skip-gram model is to maximize the average log probability $$\frac{1}{T} \sum_{t=1}^{T} \sum_{-c \leq j \leq c, j \neq 0} \log p(w_{t+j}|w_t) \qquad \text{Eq. 1}$$

where c is the size of the training context (which can be a function of the center word $w_t$). Larger c results in more training examples and thus can lead to a higher accuracy, at the expense of the training time.

The basic Skip-gram formulation defines $p(w_{t+j}|w_t)$ using the softmax function:

$$p(w_O|w_I) = \frac{\exp\left(v'^{T}_{w_O} v_{w_I}\right)}{\sum_{w=1}^{W} \exp\left(v'^{T}_{w} v_{w_I}\right)} \qquad \text{Eq. 2}$$

where $v_w$ and $v'_w$ are the "input" and "output" vector representations of w, and W is the number of words in the vocabulary.

Utilizing the word vector model, we map words from the corpus into vectors within a hundred-dimensional vector space, formalizing the transformation as a function $f$: word $7 \to \mathbb{R}^{100}$. We then use cosine similarity to compute the similarity score between input cyber terms and other terms. The similarity score can be represented as:

$$\text{Similarity}(w_p, w_q) = \frac{v_{w_p} \cdot v_{w_q}}{\|v_{w_p}\| \|v_{w_q}\|} \qquad \text{Eq. 3}$$

Here, $w_p$ and $w_q$ represent two different words, and $v_{w_p}$ and $v_{w_q}$ are their respective word vectors obtained from the skip-gram model. The dot product in the numerator measures the similarity in the orientation of the vectors, and the denominator normalizes the similarity by the magnitudes of the vectors. This cosine similarity metric provides a measure of the directional similarity between words in the vector space, ranging from 0 (completely dissimilar) to 1 (completely similar). This approach allows us to quantify the semantic relationships between cyber terms and other terms in our corpus, aiding in the analysis of the contextual associations between words.

Figure 6:
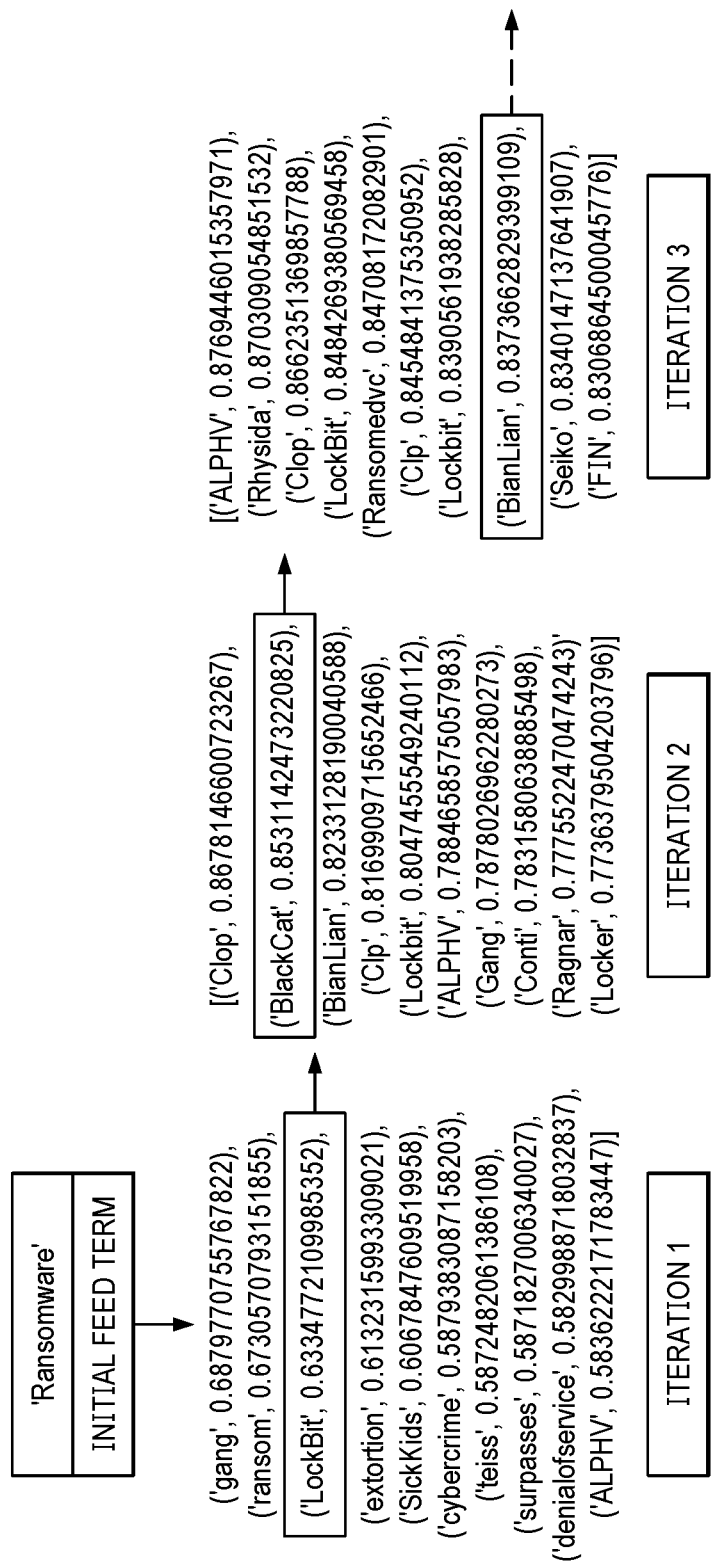
FIG. 6 illustrates an example of cyber signal discovery using "ransomware" as a feed term in accordance with an illustrative embodiment.

The cyber signal discovery module adheres to two principal criteria for term selection: (1) candidate terms exhibit at least a 60% similarity score to the given cyber term, and (2) candidate terms do not duplicate or merely extend the existing entries in our cyber terminology database. FIG. 6 illustrates the cyber signal discovery procedure using 'ransomware' as an input feed term. In the first iteration, terms such as 'LockBit' and 'SickKids' that score above the similarity threshold and are not already cataloged are identified. These terms are then subjected to human validation. For instance, 'LockBit' is approved and subsequently becomes a seed term for the next iteration, leading to the discovery of 'BlackCat' and 'BianLian' in subsequent rounds. This iterative process effectively enriches the database with relevant and emerging cyber terms.

Silver labeling is an innovative technique situated between gold standard annotations and unsupervised predictions. It is particularly valuable in scenarios where acquiring labeled data is cost-prohibitive or logistically challenging. In our study, silver labels were generated to extend our training dataset, enabling us to train supervised models with a more substantial and diverse set of examples than would be feasible with manually annotated data alone.

The illustrative embodiments use the random forest algorithm for its ensemble approach that averages predictions from multiple decision trees, reducing overfitting risks. It is particularly suited for our small dataset size, outperforming gradient boosting methods like XGBoost and LightGBM that typically require larger datasets to avoid learning noise as patterns. We implemented a Random Forest with 100 decision trees, optimized through cross-validation to ensure a balance between computational efficiency and predictive accuracy. The decision trees utilize entropy as a measure to maximize split quality, defined as:

$$E(S) = \sum_{i=1}^{c} -p_i \log_2 p_i$$

where $p_i$ represents the probability of an element belonging to class i, and c is the number of classes.

Information Gain (IG), crucial for determining the most informative feature at each split, is used in our model to guide the decision-making process of the trees:

$$IG(D, A) = E(D) - \sum_{j=1}^{m} \frac{|D_j|}{|D|} E(D_j)$$

Here, IG(D,A) is the information gain from partitioning dataset D with feature A, E(D) is the dataset's entropy, m is the number of distinct values feature A can take, and $E(D_j)$ is the entropy of the subset where A equals j. The term $$\frac{|D_j|}{|D|}$$

weights the entropy of each subset, indicating the proportion of instances in subset $D_j$ post-split. Information gain quantifies the expected reduction in entropy upon learning the value of attribute A.

The illustrative embodiments employ a CANAL (Cyber Activity News Alerting Language) model, a fine-tuned BERT model crafted for cyber news categorization. BERT's architecture includes multi-layer bidirectional transformer encoders, self-attention mechanisms, and feed-forward neural networks, which are adept at processing complex text.

The classifier layer is added atop the BERT model for classification tasks. The final hidden state from BERT, denoted by h, with weights W and bias b, produces the output y via:

$$y = f(W \cdot h + b) \qquad \text{Eq. 4}$$

where $f$ is the softmax activation function. Fine-tuning with a lower learning rate using AdamW optimizer and a custom learning rate scheduler is used retain the pre-trained knowledge.

The softmax function for the classifier output is:

$$\text{softmax}(y_i) = \frac{e^{y_1}}{\sum_j e^{y_1}} \qquad \text{Eq. 5}$$

where $y_i$ is the output logit for class i.

Figures 7A, 7B:
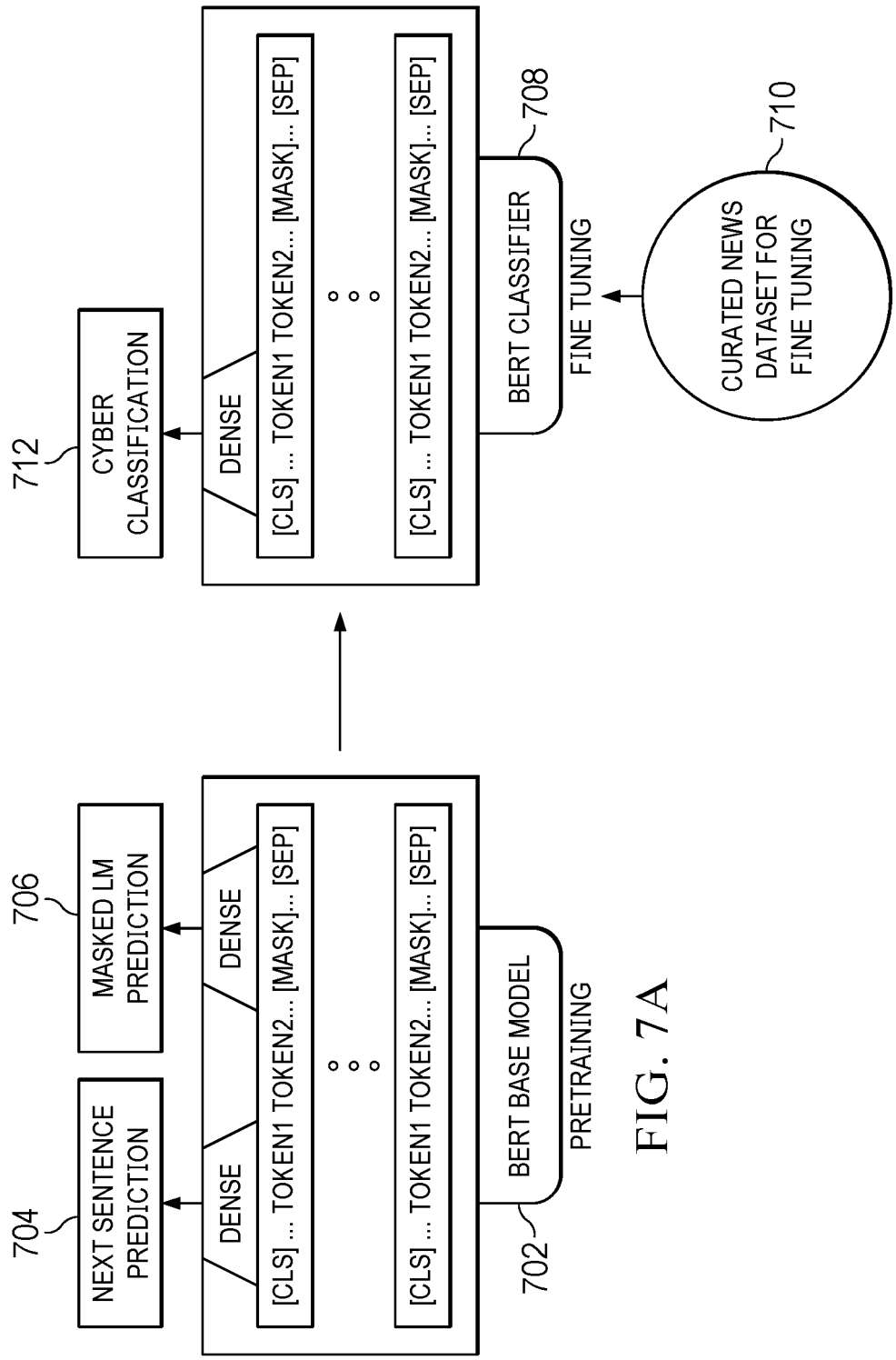
FIG. 7A depicts a base BERT model to which the illustrative embodiments can be applied.
FIG. 7B depicts a schematic diagram of a CANAL model in accordance with an illustrative embodiment.

FIG. 7A depicts a base BERT model to which the illustrative embodiments can be applied. FIG. 7B depicts a schematic diagram of a CANAL model in accordance with an illustrative embodiment. FIG. 7A outlines the BERT Base Model structure 702, showcasing its dual training objectives: Next Sentence Prediction 704 and Masked Language Model (LM) Prediction 706. These components process sequences of tokenized inputs, each sequence initiated with a [CLS] token and interspersed with [SEP] tokens. FIG. 7B depicts the BERT Classifier 708, which has been fine-tuned from the BERT base model 702 in FIG. 7A using a curated dataset 710 specific to cyber-related news for enhanced classification accuracy. The classifier also processes tokenized inputs through dense layers, ultimately yielding categorized cyber classification outputs 712. This schematic encapsulates the model's initial pre-training on diverse language data followed by its subsequent specialization through fine-tuning for cyber threat detection and classification.

Several fine-tuning techniques were used to optimize CANAL's performance including Partial Finetuning with PEFT (Parameter-Efficient Fine-Tuning), and the integration of PEFT with LoRA (Low-Rank Adaptation).

Parameter-Efficient Fine-Tuning (PEFT) is known for its efficiency in fine-tuning large LLMs. While full fine-tuning updates all parameters, partial fine-tuning in PEFT selectively freezes a portion of the model's weights while fine-tuning the rest.

The fine-tuning process for both full and partial parameter updates explores the performance impact on our multiclass classification task, providing insights into the trade-offs between computational efficiency and classification effectiveness.

PEFT can be combined with Low-Rank Adaptation (LoRA). LoRA updates a pre-trained weight matrix $W_0$ with a low-rank decomposition $W_0 + \Delta W = W_0 + BA$, where $B \in$ $\mathbb{R}^{d\times r}$ and $A \in \mathbb{R}^{r\times k}$, and the rank $r \ll \min(d,k)$. As shown in FIG. 8, during training, $W_0$ is frozen, while A and B contain trainable parameters. The modified forward pass with LoRA is:

$$h = W_0 x + \Delta W x = W_0 x + BAx \qquad \text{Eq. 6}$$

This approach integrates BERT's architecture with PEFT and LoRA fine-tuning for effective cyber multiclassification, as demonstrated in our methodology.

An Entity Relevance Module may form part of the system to enhance the processing of news articles by determining the contextual relevance of identified entities within the text. Unlike standard Named Entity Recognition (NER) models that simply tag entities, this module assesses their contextual significance within the news titles.

For instance, in the statement "Cyber attacks rise, says Y Bank," a traditional NER model would identify "Y Bank" as an entity, but the Entity Relevance Module also evaluates its contextual relevance, recognizing that "Y Bank" is offering an opinion rather than being the central focus.

The model applies a sigmoid function to determine the probability of relevance:

$$P(\text{Class 1 - Relevant}) = \sigma(W \cdot \Phi(\text{input}) + b)$$

where $\sigma$ denotes the sigmoid activation function, W and b are the model weights and bias, and $\Phi(\text{input})$ is the feature representation of the input.

The Entity Relevance Module is trained on labeled data, producing probabilities that contribute to nuanced entity-centric analysis.

The dataset utilized for training in this study was collated over a period extending from January 2022 to September 2023. This comprehensive dataset comprises a diverse array of samples a total volume of about 250,000 samples. In assessing the performance of CANAL, exclusive data from October 2023 was employed for the evaluation. Specifically, a subset comprising 2000 articles from the articles of that month was sampled for testing.

A subset of 600 samples from train set was meticulously labeled by domain experts to establish a 'Gold Standard' dataset. Special attention was paid to addressing class imbalance through stratified sampling and weighting classes inversely proportional to their frequencies in the input data. This dataset served as a benchmark for the initial Random Forest model training.

The Random Forest model, initially trained on the 600-sample 'Gold Standard' dataset, was then applied to the remaining data spanning from 2022 to September 2023. This step involved using the trained model to automate the labeling process, thereby generating 'Silver Labels' for a large volume of data. This approach enabled us with an additional 8000 records, which exhibited a high degree of certainty in their labeling.

The selected sample set, enriched with both gold and silver labeled data, was employed for the fine-tuning of a BERT based model. This subset was specifically chosen to represent the population distribution accurately, ensuring that the model's training would be reflective of the diverse characteristics present within the larger dataset.

The Emerging Cyber Signal Discovery Module may be executed, e.g., on a monthly basis to identify novel cyber terms. Prior to each run, the word vector model undergoes updates through the latest news data. We conclude the process either after 10 runs or when our stopping criteria are met. These criteria include: (1) words exhibiting a similarity score greater than 60% to the specified cyber term, and (2) words that neither duplicate nor merely extend the entries present in our cyber terminology database. We halt the process at the occurrence of the first of these conditions. This periodic assessment ensures the continuous detection and incorporation of emerging cybersecurity terminology, contributing to the adaptability and efficacy of the system in capturing evolving cyber threats.

Our Random Forest (RF) model was trained on a Gold Standard dataset comprising 600 samples with expertly annotated labels to establish a robust initial model. The hyperparameters of the model are listed in the table shown in FIG. 8. To counter potential bias in silver label generation, we filtered our data retrieval with precise SQL queries, ensuring a representative dataset for training. This phase was critical for establishing a strong foundational model capable of further refinement and application on a larger dataset.

We conducted a series of four distinct BERT fine-tuning runs, each with a specific configuration aimed at exploring the effects of different levels of layerwise training on model performance. The first run involved a Parameter efficient fine-tuning (PeFT) approach with a Low-Rank Adaptation (LoRA) with a rank of 8, which creates adapter weight matrices which are used in conjunction with complete model weights to work on classification task. The second run was confined to training only the last layer of the BERT model in conjunction with the classification layer. The third run extended the training to include the last two layers of the BERT model alongside the classification layer. The final run encompassed a comprehensive fine-tuning of the entire BERT model.

In our fine-tuning methodology, we employed gradient freezing for all layers except the ones undergoing fine-tuning. This technique not only requires less computational power but also reduces the time needed for model training compared to full model fine-tuning. Gradient freezing is a commonly adopted practice within the machine learning community for its efficiency in fine-tuning deep learning models.

The table shown in FIG. 9 provides final hyper-parameters used for BERT model fine-tuning. A comprehensive analysis of the training, validation cross entropy loss and recall trends across multiple epochs during the finetuning process of the BERT-based model is plotted in FIG. 10. The x-axis represents the number of training epochs, ranging from 1 to 10. The y-axis denotes the cross entropy loss values and recall values, which are computed for both the training and validation datasets.

CANAL, finetuned BERT model, is designed to optimize cross-entropy loss across five cyber categories in a multi-class categorization context. For a comparative analysis with other LLMs, where probability distributions are inaccessible, we adopt standard metrics such as Precision, Recall, F1-Score, and Accuracy. These metrics are chosen for their clarity in conveying performance insights.

Cross-Entropy Loss (Log Loss) quantifies the difference between predicted and actual class probabilities.

$$\text{Log Loss} = -\frac{1}{N}\sum_{i=1}^{N}\sum_{j=1}^{M} y_{ij}\log(p_{ij})$$

where N is the number of instances, M is the number of classes, $y_{ij}$ is 1 if instance i is in class j, and $p_{ij}$ is the predicted probability.

Precision evaluates the proportion of accurate positive predictions.

$$Precision = \frac{True\ Positives}{Ture\ Positives + False\ Positives}$$

Recall measures the model's ability to identify all positive instances.

$$Recall = \frac{True\ Positives}{Ture\ Positives + False\ Negatives}$$

The F1-Score balances precision and recall, providing a comprehensive performance measure.

$$F1-Score = \frac{2 \cdot Precision \cdot Recall}{Precision + Recall}$$

Accuracy quantifies the overall correctness of the model's predictions.

$$Accuracy = \frac{Number\ of\ Correct\ Predictions}{Total\ Number\ of\ Predictions}$$

The Emerging Cyber Signal Discovery Module operates with a human-in-the-loop moderation approach. During each iteration, the algorithm generates a set of signals on average, proportional to the quantity of novel cyber-related content in the news. Typically, 15-20% of these signals are accepted through human validation. Compared to the exhaustive manual selection of cyber terminology, our module demonstrates remarkable efficiency in terms of time savings and in discerning emerging cyber attack-related terms.

Figure 11:
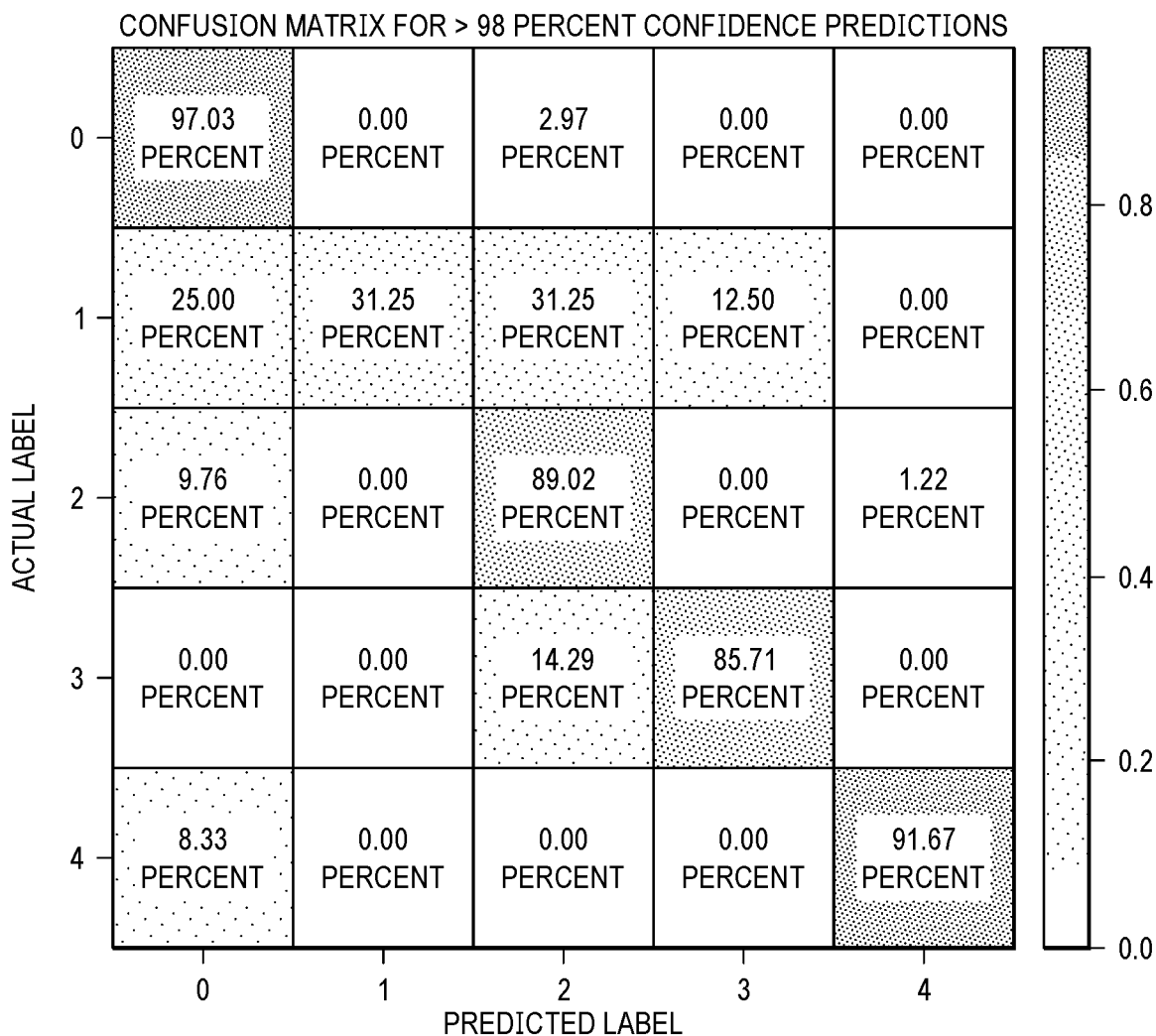
FIG. 11 depicts a confusion matrix for the Random Forest classifier in accordance with an illustrative embodiment.

We applied various probability thresholds to the Random Forest classifier, ultimately settling on a 0.98 cutoff for sample inclusion. This threshold, rigorously chosen, ensures that only predictions with a confidence level of 0.98 or higher are considered. We ensured that this approach mirrors the distribution observed in the full dataset, allowing us to cultivate a sample that closely aligns with gold standard data quality. The resulting subset, approximately 8,000 records strong, showcases a high level of labeling confidence. FIG. 11 depicts a confusion matrix for the Random Forest classifier, demonstrating its accuracy when operating above this stringent confidence threshold.

Figure 10:
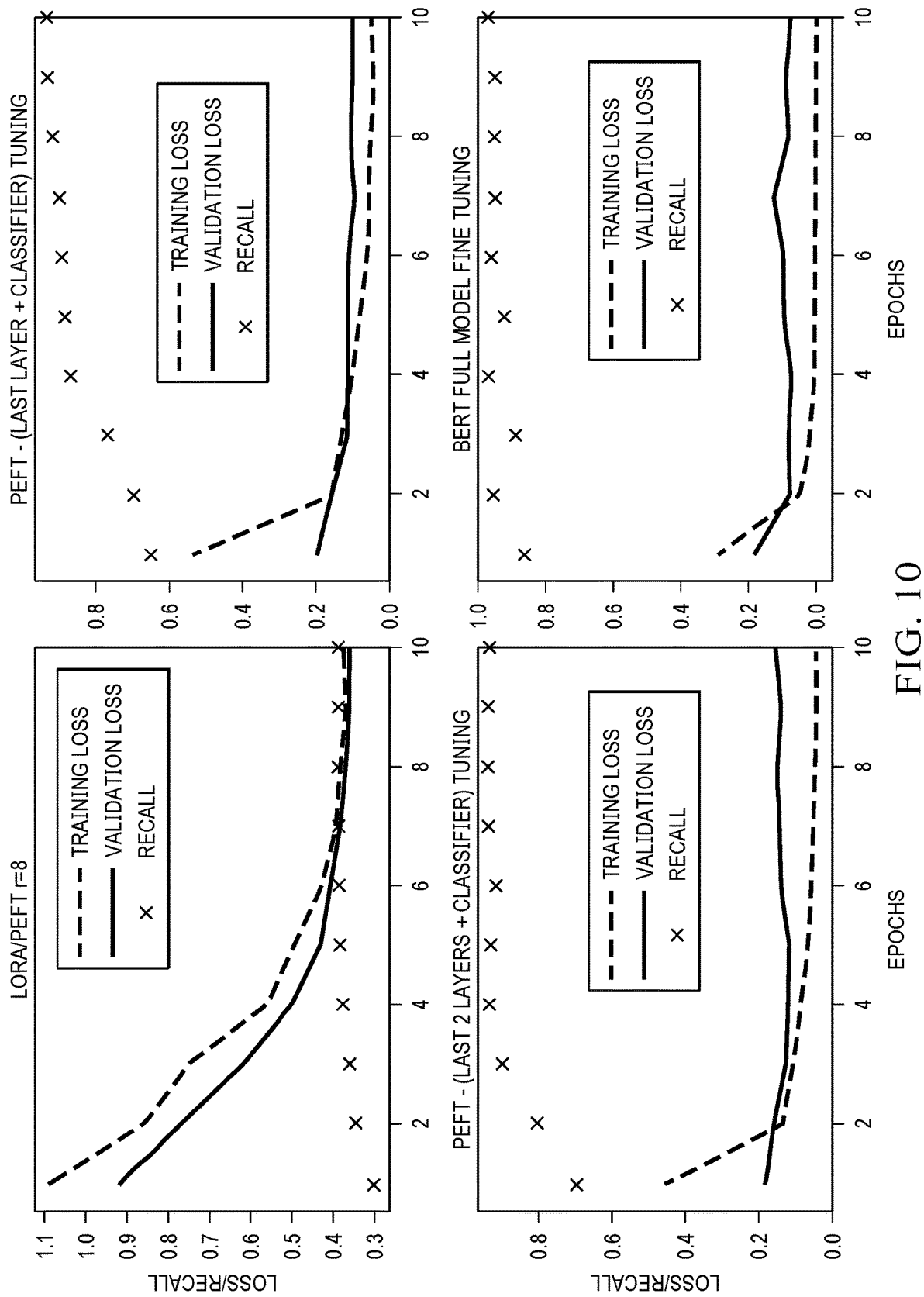
FIG. 10 depicts plots of training and validation cross-entropy loss for different fine-tuning approaches in accordance with an illustrative embodiment.
Figure 12:
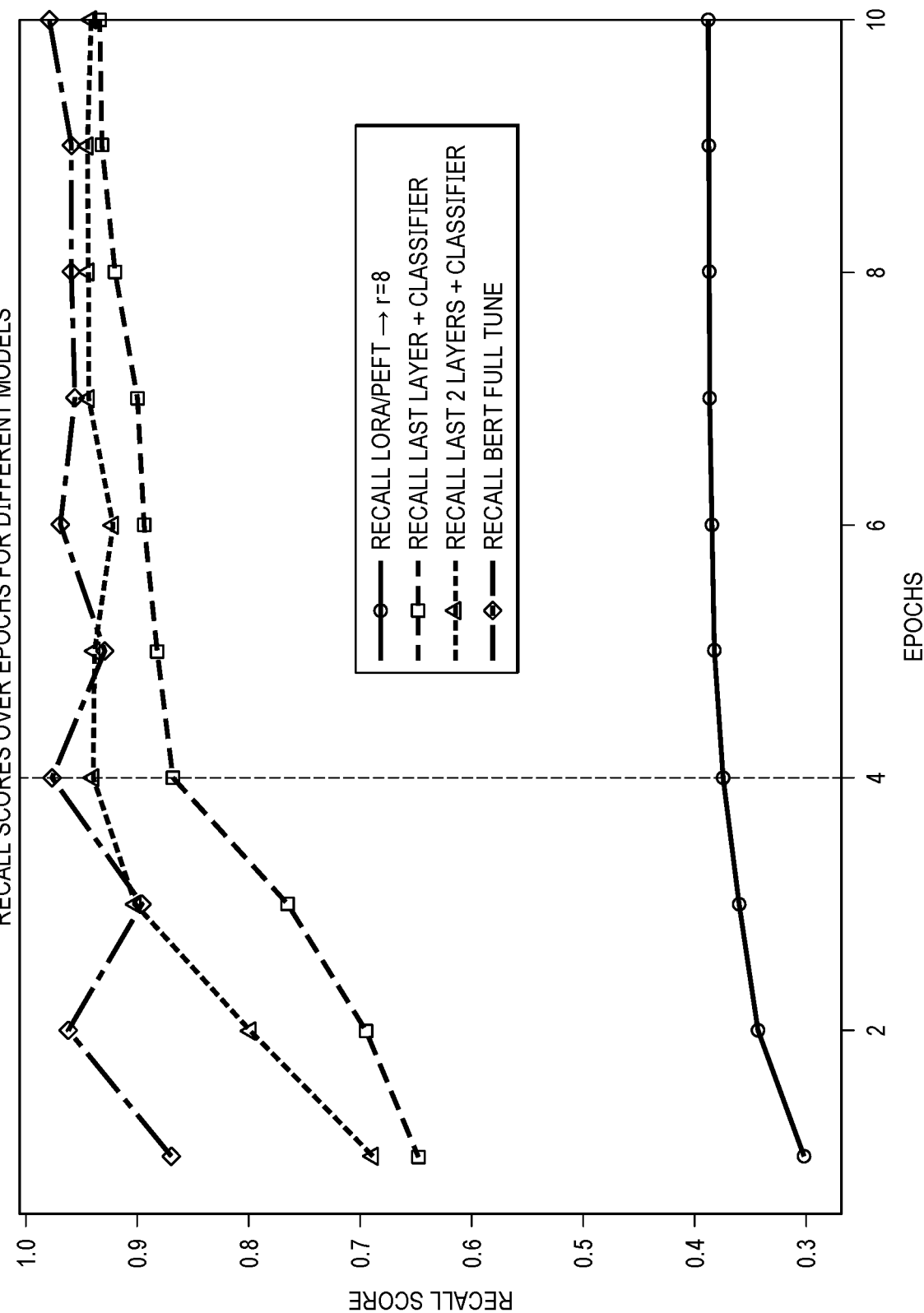
FIG. 12 depicts a chart recall score for different BERT fine-tuning schemes in accordance with an illustrative embodiment.

After examining the loss in FIG. 10 and the recall shown in FIG. 12 at checkpoint 4 (epoch 4), the full fine-tuning of the BERT model demonstrated the best performance compared to other methods. While the focus was on absolute performance in which full fine-tuning excelled, it is worth noting that other configurations, such as fine-tuning only the last layer plus the classifier and the last two layers plus the classifier, also showed promising results. These strategies may be preferred in scenarios where computational resources are limited or when working with very large models, where full fine-tuning would be too resource-intensive.

FIG. 13 depicts an example table of CANAL model performance in accordance with an illustrative embodiment. In comparison between CANAL and other expensive LLMs, CANAL emerges as the superior performer across all five assessed categories. For categories with very few samples, such as prevention and the future threat category, we expected these highly capable LLMs to perform well due to their training on large datasets. However, CANAL outperforms the expensive LLMs in these categories.

In categories with a more substantial number of training samples, such as recent cyber attack and other categories, CANAL exhibits even more exceptional performance than other LLMs. These findings underscore CANAL's robust and consistently superior performance across diverse categories, reinforcing its efficacy in handling nuanced language tasks.

FIG. 14 depicts a table of example classification snippets generated by a CANAL model in accordance with an illustrative embodiment. The table in FIG. 14 exhibits the culmination of our multifaceted analysis pipeline. The dual approach begins with key element extraction: identifying relevant entities via an entity relevance model and pinpointing cyber signals through our continually updated cyber taxonomy. Subsequently, CANAL is deployed for cyber news classification. This integrated process enables us to construct in-depth cyber risk profiles, leveraging news data tailored to specific entities.

Figure 15:
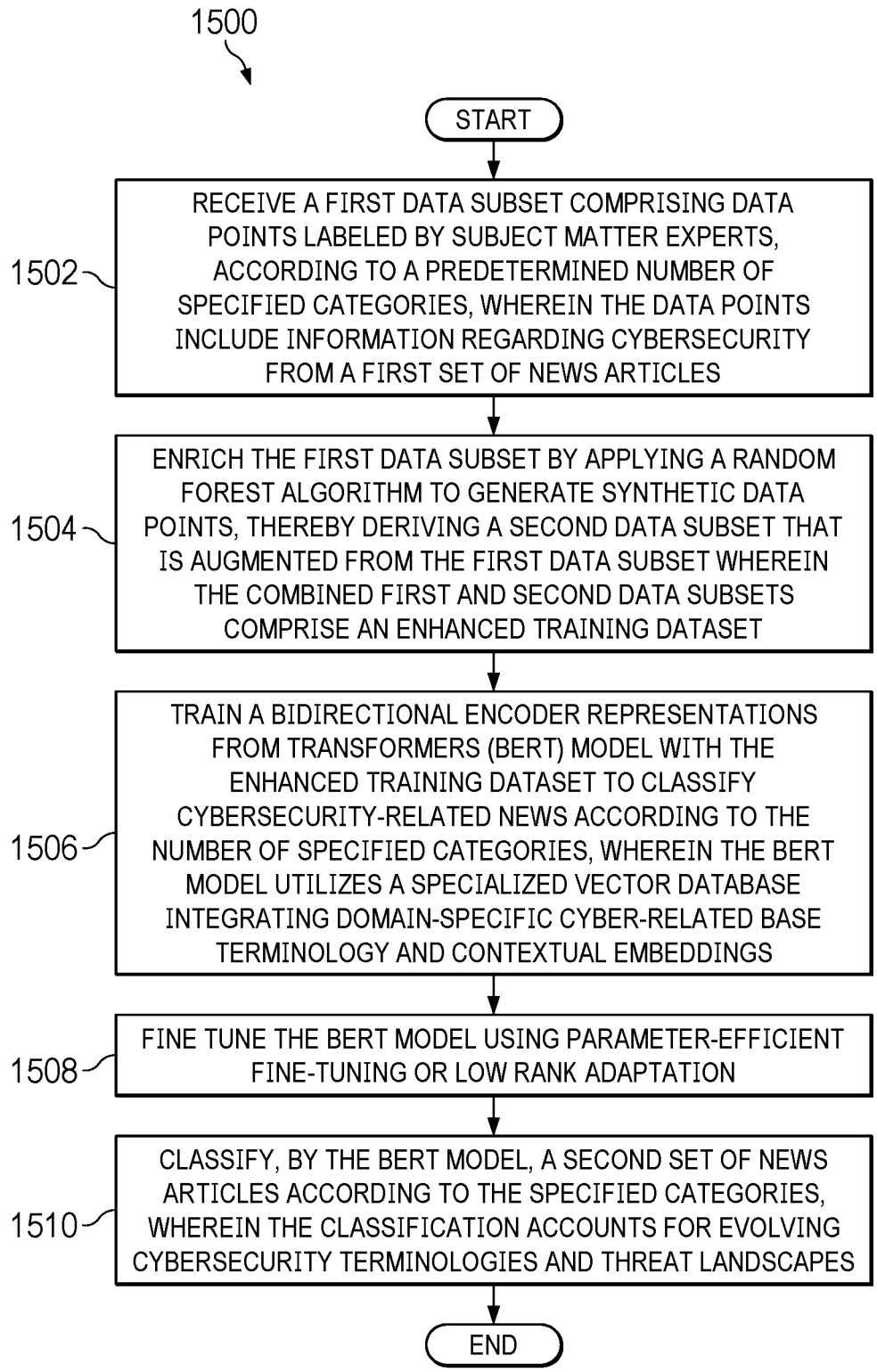
FIG. 15 depicts a flowchart illustrating a process for classifying cybersecurity signals from media sources into distinct categories in accordance with an illustrative embodiment.

FIG. 15 depicts a flowchart illustrating a process for classifying cybersecurity signals from media sources into distinct categories in accordance with an illustrative embodiment. Process 1500 can be implemented in cybersecurity classification system 200 in FIG. 2.

Process 1500 begins by receiving a first data subset comprising data points labeled by subject matter experts according to a predetermined number of specified categories, wherein the data points include information regarding cybersecurity from a first set of news articles (step 1502).

Process 1500 then enriches the first data subset by applying a random forest algorithm to generate synthetic data points, thereby deriving a second data subset that is augmented from the first data subset, wherein the combined first and second data subsets comprise an enhanced training dataset (step 1504).

Process 1500 trains a bidirectional encoder representations from transformers (BERT) model with the enhanced training dataset to classify cybersecurity-related news according to the number of specified categories, wherein the BERT model utilizes a specialized vector database integrating domain-specific cyber-related base terminology and contextual embeddings (step 1506).

Process 1500 can fine tune the BERT model using parameter-efficient fine-tuning or low rank adaptation (step 1508). Fine-tuning might further comprise applying gradient freezing to the BERT model during fine-tuning, wherein the gradient freezing is applied to all layers except layers undergoing fine-tuning. Fine-tuning might comprise fine-tuning the last layer of the BERT model in conjunction with a classifier layer or fine-tuning the last two layers of the BERT model in conjunction with a classifier layer.

Fine-tuning the BERT model using the parameter-efficient fine-tuning might further comprise using low rank adaptation that creates adapter weight matrices which are used with complete model weights to perform classification.

After fine-tuning, the trained BERT model classifies a second set of news articles according to the specified categories, wherein the classification accounts for evolving cybersecurity terminologies and threat landscapes. Process 1500 then ends.

Figure 16:
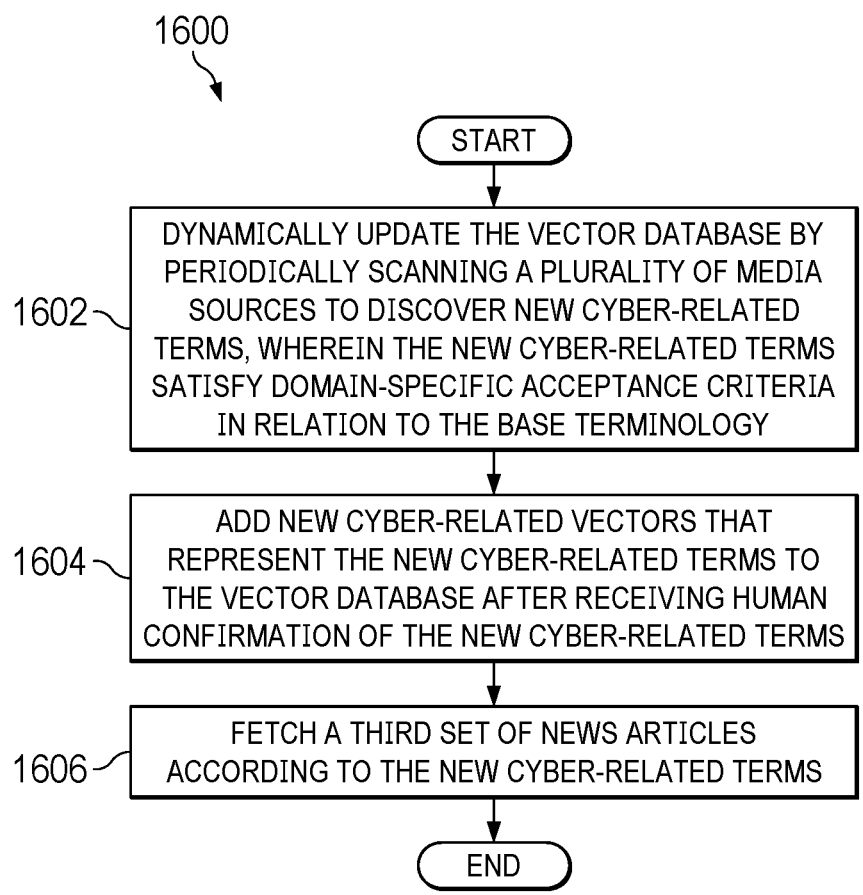
FIG. 16 depicts a flowchart illustrating a process for discovering new cyber-related terms in accordance with an illustrative embodiment.

FIG. 16 depicts a flowchart illustrating a process for discovering new cyber-related terms in accordance with an illustrative embodiment. Process 1600 can occur concurrently with process 1500 or periodically as a preliminary to process 1500 to update the BERT model.

Process 1600 dynamically updating the vector database by periodically scanning a plurality of media sources to discover new cyber-related terms, wherein the new cyber-related terms satisfy domain-specific acceptance criteria in relation to the base terminology (step 1602).

Process 1600 adds new cyber-related vectors that represent the new cyber-related terms to the vector database after receiving human confirmation of the new cyber-related terms (step 1604). The new cyber-related vectors have a cosine similarity score with an existing cyber term greater than a specified threshold. The new cyber-related terms neither duplicate nor extend the cyber-related terms already present in the base terminology.

After the addition of the new cyber-related vectors representing the new cyber-related terms, process 1600 then fetching a new third set of news articles according to the new cyber-related terms (step 1606). This new third set of news articles can be passed to the trained BERT model for cyber category classification or be used for further fine tuning of the BERT model. Process 1600 then ends.

Figure 17:
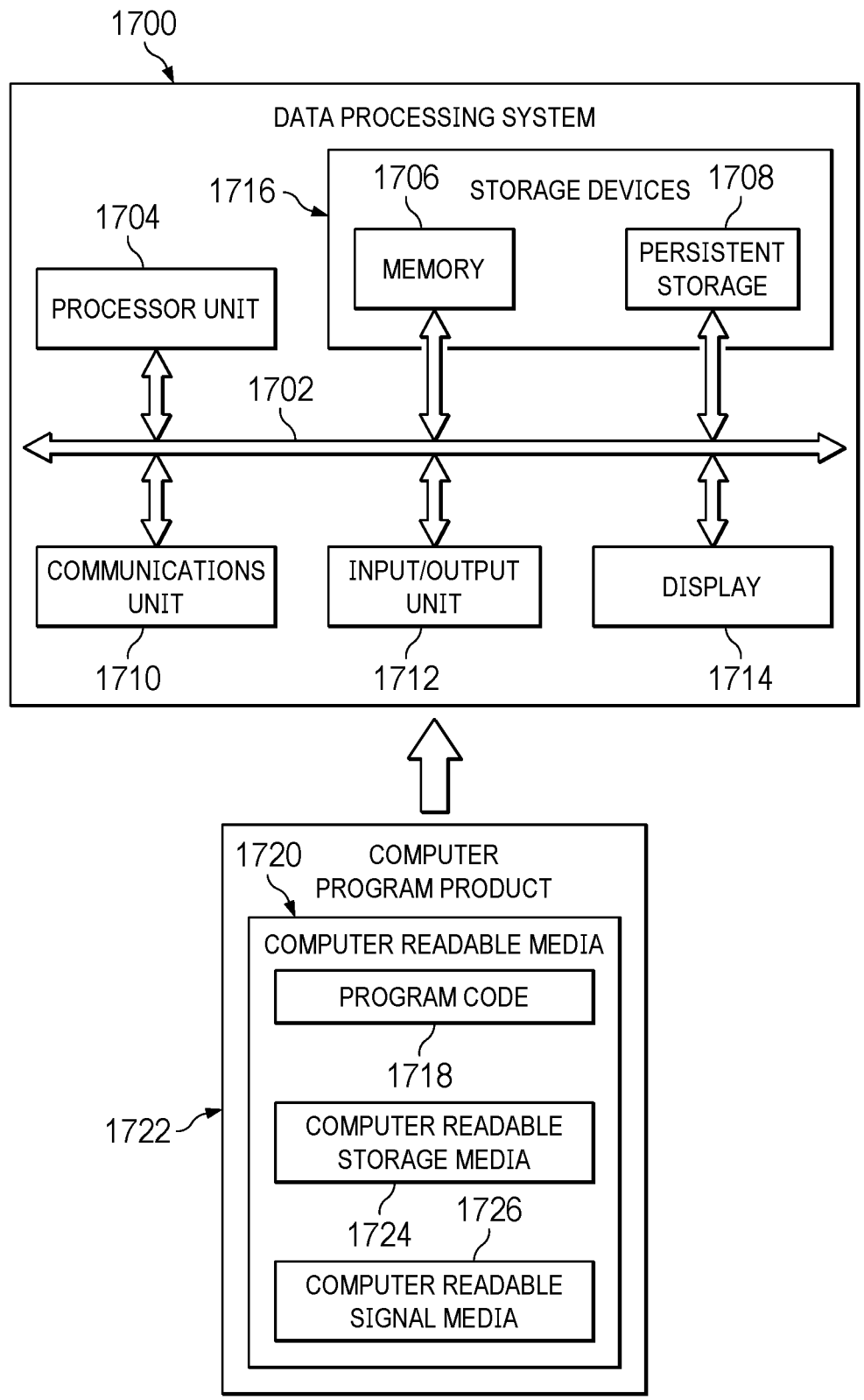
FIG. 17 is a block diagram of a data processing system in accordance with an illustrative embodiment.

Turning now to FIG. 17, an illustration of a block diagram of a data processing system is depicted in accordance with an illustrative embodiment. Data processing system 1700 may be used to implement server computer 104 and server computer 106 and client devices 110 in FIG. 1, as well as computer system 250 in FIG. 2. In this illustrative example, data processing system 1700 includes communications framework 1702, which provides communications between processor unit 1704, memory 1706, persistent storage 1708, communications unit 1710, input/output unit 1712, and display 1714. In this example, communications framework 1702 may take the form of a bus system.

Processor unit 1704 serves to execute instructions for software that may be loaded into memory 1706. Processor unit 1704 may be a number of processors, a multi-processor core, or some other type of processor, depending on the particular implementation. In an embodiment, processor unit 1704 comprises one or more conventional general-purpose central processing units (CPUs). In an alternate embodiment, processor unit 1704 comprises one or more graphical processing units (GPUs).

Memory 1706 and persistent storage 1708 are examples of storage devices 1716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1716 may also be referred to as computer-readable storage devices in these illustrative examples. Memory 1706, in these examples, may be, for example, a random access memory or any other suitable volatile or non-volatile storage device. Persistent storage 1708 may take various forms, depending on the particular implementation.

For example, persistent storage 1708 may contain one or more components or devices. For example, persistent storage 1708 may be a hard drive, a flash memory, a rewritable optical disk, a rewritable magnetic tape, or some combination of the above. The media used by persistent storage 1708 also may be removable. For example, a removable hard drive may be used for persistent storage 1708. Communications unit 1710, in these illustrative examples, provides for communications with other data processing systems or devices. In these illustrative examples, communications unit 1710 is a network interface card.

Input/output unit 1712 allows for input and output of data with other devices that may be connected to data processing system 1700. For example, input/output unit 1712 may provide a connection for user input through at least one of a keyboard, a mouse, or some other suitable input device. Further, input/output unit 1712 may send output to a printer. Display 1714 provides a mechanism to display information to a user.

Instructions for at least one of the operating system, applications, or programs may be located in storage devices 1716, which are in communication with processor unit 1704 through communications framework 1702. The processes of the different embodiments may be performed by processor unit 1704 using computer-implemented instructions, which may be located in a memory, such as memory 1706.

These instructions are referred to as program code, computer-usable program code, or computer-readable program code that may be read and executed by a processor in processor unit 1704. The program code in the different embodiments may be embodied on different physical or computer-readable storage media, such as memory 1706 or persistent storage 1708.

Program code 1718 is located in a functional form on computer-readable media 1720 that is selectively removable and may be loaded onto or transferred to data processing system 1700 for execution by processor unit 1704. Program code 1718 and computer-readable media 1720 form computer program product 1722 in these illustrative examples. In one example, computer-readable media 1720 may be computer-readable storage media 1724 or computer-readable signal media 1726.

In these illustrative examples, computer-readable storage media 1724 is a physical or tangible storage device used to store program code 1718 rather than a medium that propagates or transmits program code 1718. Computer readable storage media 1724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1718 may be transferred to data processing system 1700 using computer-readable signal media 1726. Computer-readable signal media 1726 may be, for example, a propagated data signal containing program code 1718. For example, computer-readable signal media 1726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1700 are not meant to provide architectural limitations to the manner in which different embodiments may be implemented. The different illustrative embodiments may be implemented in a data processing system including components in addition to or in place of those illustrated for data processing system 1700. Other components shown in FIG. 17 can be varied from the illustrative examples shown. The different embodiments may be implemented using any hardware device or system capable of running program code 1718.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component with an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for classifying cybersecurity signals from media sources into distinct categories, the method comprising:
   receiving a first data subset comprising data points labeled by subject matter experts according to a predetermined number of specified categories, wherein the data points include information regarding cybersecurity from a first set of news articles;
   enriching the first data subset by applying a random forest algorithm to generate synthetic data points, thereby deriving a second data subset that is augmented from the first data subset, wherein the combined first and second data subsets comprise an enhanced training dataset;
   training a bidirectional encoder representations from transformers (BERT) model with the enhanced training dataset to classify cybersecurity-related news according to the number of specified categories, wherein the BERT model utilizes a specialized vector database integrating domain-specific cyber-related base terminology and contextual embeddings; and
   classifying, by the BERT model, a second set of news articles according to the specified categories, wherein the classification accounts for evolving cybersecurity terminologies and threat landscapes.

2. The method of claim 1, further comprising:
   dynamically updating the vector database by periodically scanning a plurality of media sources to discover new cyber-related terms, wherein the new cyber-related terms satisfy domain-specific acceptance criteria in relation to the base terminology;
   adding new cyber-related vectors that represent the new cyber-related terms to the vector database after receiving human confirmation of the new cyber-related terms; and
   fetching a third set of news articles according to the new cyber-related terms.

3. The method of claim 2, wherein the new cyber-related vectors have a cosine similarity score with an existing cyber term greater than a specified threshold.

4. The method of claim 2, wherein the new cyber-related terms neither duplicate nor extend the cyber-related terms already present in the base terminology.

5. The method of claim 1, further comprising fine-tuning the BERT model using parameter-efficient fine-tuning.

6. The method of claim 5, wherein fine-tuning the BERT model further comprises at least one of:
   applying gradient freezing to the BERT model during fine-tuning, wherein the gradient freezing is applied to all layers except layers undergoing fine-tuning;
   fine-tuning the last layer of the BERT model in conjunction with a classifier layer; or
   fine-tuning the last two layers of the BERT model in conjunction with a classifier layer.

7. The method of claim 5, wherein using the parameter-efficient fine-tuning further comprises using low rank adaptation that creates adapter weight matrices which are used with complete model weights to perform classification.

8. The method of claim 1, wherein the specified categories of cybersecurity-related news comprise:
   recent cyber attack;
   cyber-related litigation;
   future cyber threats; and
   cyber risk prevention.

9. A system for classifying cybersecurity signals from media sources into distinct categories, the system comprising:
   a storage device that stores program instructions;
   one or more processors operably connected to the storage device and configured to execute the program instructions to cause the system to:
   receive a first data subset comprising data points labeled by subject matter experts according to a predetermined number of specified categories, wherein the data points include information regarding cybersecurity from a first set of news articles;
   enrich the first data subset by applying a random forest algorithm to generate synthetic data points, thereby deriving a second data subset that is augmented from the first data subset, wherein the combined first and second data subsets comprise an enhanced training dataset;
   train a bidirectional encoder representations from transformers (BERT) model with the enhanced training dataset to classify cybersecurity-related news according to the number of specified categories, wherein the BERT model utilizes a specialized vector database integrating domain-specific cyber-related base terminology and contextual embeddings; and
   classify, by the BERT model, a second set of news articles according to the specified categories, wherein the classification accounts for evolving cybersecurity terminologies and threat landscapes.

10. The system of claim 9, wherein the processors further execute program instructions for:
    dynamically updating the vector database by periodically scanning a plurality of media sources to discover new cyber-related terms, wherein the new cyber-related terms satisfy domain-specific acceptance criteria in relation to the base terminology;
    adding new cyber-related vectors that represent new cyber-related terms to the vector database after receiving human confirmation of the new cyber-related terms; and
    fetching a third set of news articles according to the new cyber-related terms.

11. The system of claim 10, wherein the new cyber-related vectors have a cosine similarity score with an existing cyber term greater than a specified threshold.

12. The system of claim 10, wherein the new cyber-related terms neither duplicate nor extend the cyber-related terms already present in the base terminology.

13. The system of claim 9, wherein the processors further execute program instructions for fine-tuning the BERT model using parameter-efficient fine-tuning.

14. The system of claim 13, wherein fine-tuning the BERT model further comprises at least one of:
    applying gradient freezing to the BERT model during fine-tuning, wherein the gradient freezing is applied to all layers except layers undergoing fine-tuning;
    fine-tuning the last layer of the BERT model in conjunction with a classifier layer; or
    fine-tuning the last two layers of the BERT model in conjunction with a classifier layer.

15. The system of claim 13, wherein using the parameter-efficient fine-tuning further comprises using low rank adaptation that creates adapter weight matrices which are used with complete model weights to perform classification.

16. The system of claim 9, wherein the specified categories of cybersecurity-related news comprise:
    recent cyber attack;
    cyber-related litigation;
    future cyber threats; and
    cyber risk prevention.

17. A computer program product for classifying cybersecurity signals from media sources into distinct categories, the computer program product comprising:
    a computer-readable storage medium having program instructions embodied thereon to perform the steps of:
    receiving a first data subset comprising data points labeled by subject matter experts according to a predetermined number of specified categories, wherein the data points include information regarding cybersecurity from a first set of news articles;
    enriching the first data subset by applying a random forest algorithm to generate synthetic data points, thereby deriving a second data subset that is augmented from the first data subset, wherein the combined first and second data subsets comprise an enhanced training dataset;
    training a bidirectional encoder representations from transformers (BERT) model with the enhanced training dataset to classify cybersecurity-related news according to the number of specified categories, wherein the BERT model utilizes a specialized vector database integrating domain-specific cyber-related base terminology and contextual embeddings; and
    classifying, by the BERT model, a second set of news articles according to the specified categories, wherein the classification accounts for evolving cybersecurity terminologies and threat landscapes.

18. The computer program product of claim 17, further comprising instructions for:
    dynamically updating the vector database by periodically scanning a plurality of media sources to discover new cyber-related terms, wherein the new cyber-related terms satisfy domain-specific acceptance criteria in relation to the base terminology;
    adding new cyber-related vectors that represent new cyber-related terms to the vector database after receiving human confirmation of the new cyber-related terms; and
    fetching a third set of news articles according to the new cyber-related terms.

19. The computer program product of claim 18, wherein the new cyber-related vectors have a cosine similarity score with an existing cyber term greater than a specified threshold.

20. The computer program product of claim 18, wherein the new cyber-related terms neither duplicate nor extend the cyber-related terms already present in the base terminology.

21. The computer program product of claim 17, further comprising instructions for fine-tuning the BERT model using parameter-efficient fine-tuning.

22. The computer program product of claim 21, wherein fine-tuning the BERT model further comprises instructions for at least one of:
    applying gradient freezing to the BERT model during fine-tuning, wherein the gradient freezing is applied to all layers except layers undergoing fine-tuning;

fine-tuning the last layer of the BERT model in conjunction with a classifier layer; or fine-tuning the last two layers of the BERT model in conjunction with a classifier layer.

23. The computer program product of claim 21, wherein using the parameter-efficient fine-tuning further comprises instructions for using low rank adaptation that creates adapter weight matrices which are used with complete model weights to perform classification.

24. The computer program product of claim 17, wherein the specified categories of cybersecurity-related news comprise:

recent cyber attack;
cyber-related litigation;
future cyber threats; and
cyber risk prevention.

* * * * *